United States Patent
Miyazaki et al.

(10) Patent No.: US 8,755,296 B2
(45) Date of Patent: Jun. 17, 2014

(54) WIRELESS NETWORK SYSTEM AND WIRELESS COMMUNICATION DEVICE

(75) Inventors: Masayuki Miyazaki, Tokyo (JP); Kenichi Mizugaki, Kodaira (JP); Masaru Kokubo, Hanno (JP); Hideyuki Nagaishi, Hachioji (JP); Nobuhisa Kobayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 13/308,635

(22) Filed: Dec. 1, 2011

(65) Prior Publication Data

US 2012/0155301 A1 Jun. 21, 2012

(30) Foreign Application Priority Data

Dec. 15, 2010 (JP) ................................ 2010-279604

(51) Int. Cl.
*H04L 12/26* (2006.01)
(52) U.S. Cl.
USPC .......................... 370/252; 370/310; 709/247
(58) Field of Classification Search
USPC ........ 370/252, 328, 332, 310.2, 315; 709/247
See application file for complete search history.

(56) References Cited

U.S. PATENT DOCUMENTS

| 7,298,259 | B2 * | 11/2007 | Moriwaki | 340/539.22 |
| 8,330,596 | B2 * | 12/2012 | Tanaka et al. | 340/539.12 |
| 2003/0092467 | A1 * | 5/2003 | Masuda et al. | 455/556 |
| 2006/0268291 | A1 * | 11/2006 | Yoo | 358/1.2 |

FOREIGN PATENT DOCUMENTS

JP 7-203053 A 8/1995

* cited by examiner

*Primary Examiner* — Andrew Lai
*Assistant Examiner* — Sumitra Ganguly
(74) *Attorney, Agent, or Firm* — Crowell & Moring LLP

(57) ABSTRACT

A wireless communication device includes a sensor processing unit that generates sensor data including a measurement result acquired by a sensor; a communication measurement unit that generates communication quality data including a communication state for transmitting a packet; a compression determination unit that determines compression rates of first sensor data and first communication quality data according to the contents of the first sensor data including the transmitted sensor data and the generated sensor data or the contents of the first communication quality data including the transmitted sensor data and the generated communication quality data; a compression unit that compresses the first sensor data and the first communication quality data according to the determined compression rates; and a wireless communication unit that transmits a packet including the compressed first sensor data and the compressed first communication quality data to another wireless communication device or the access point.

12 Claims, 7 Drawing Sheets

100
WIRELESS COMMUNICATION NETWORK

100
WIRELESS COMMUNICATION NETWORK

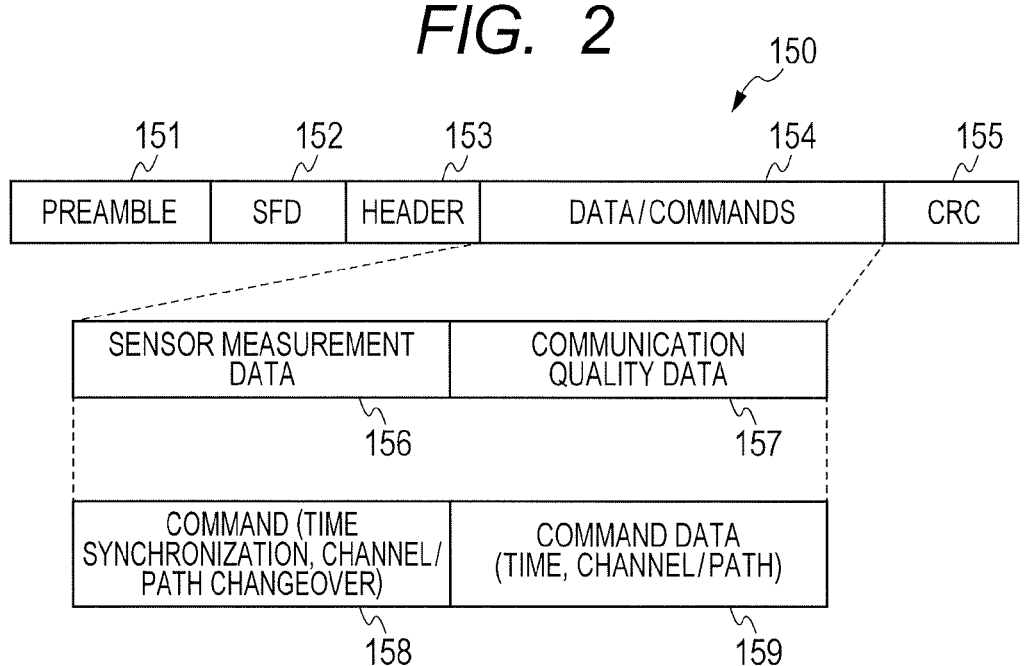
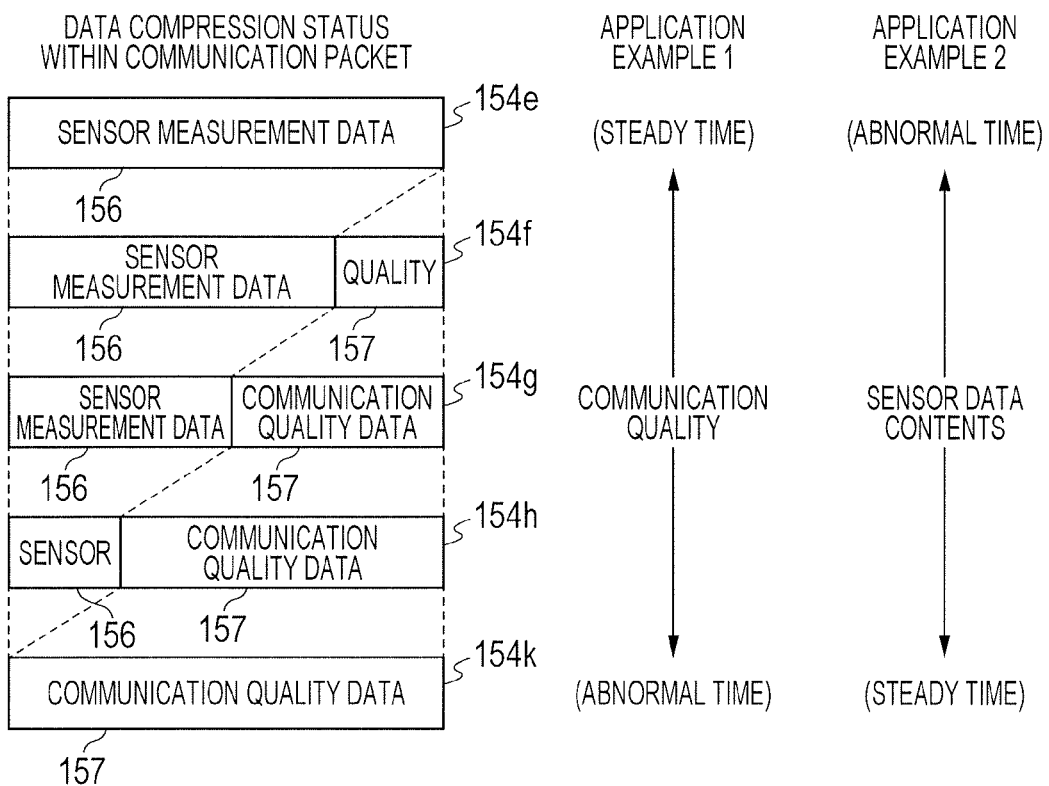

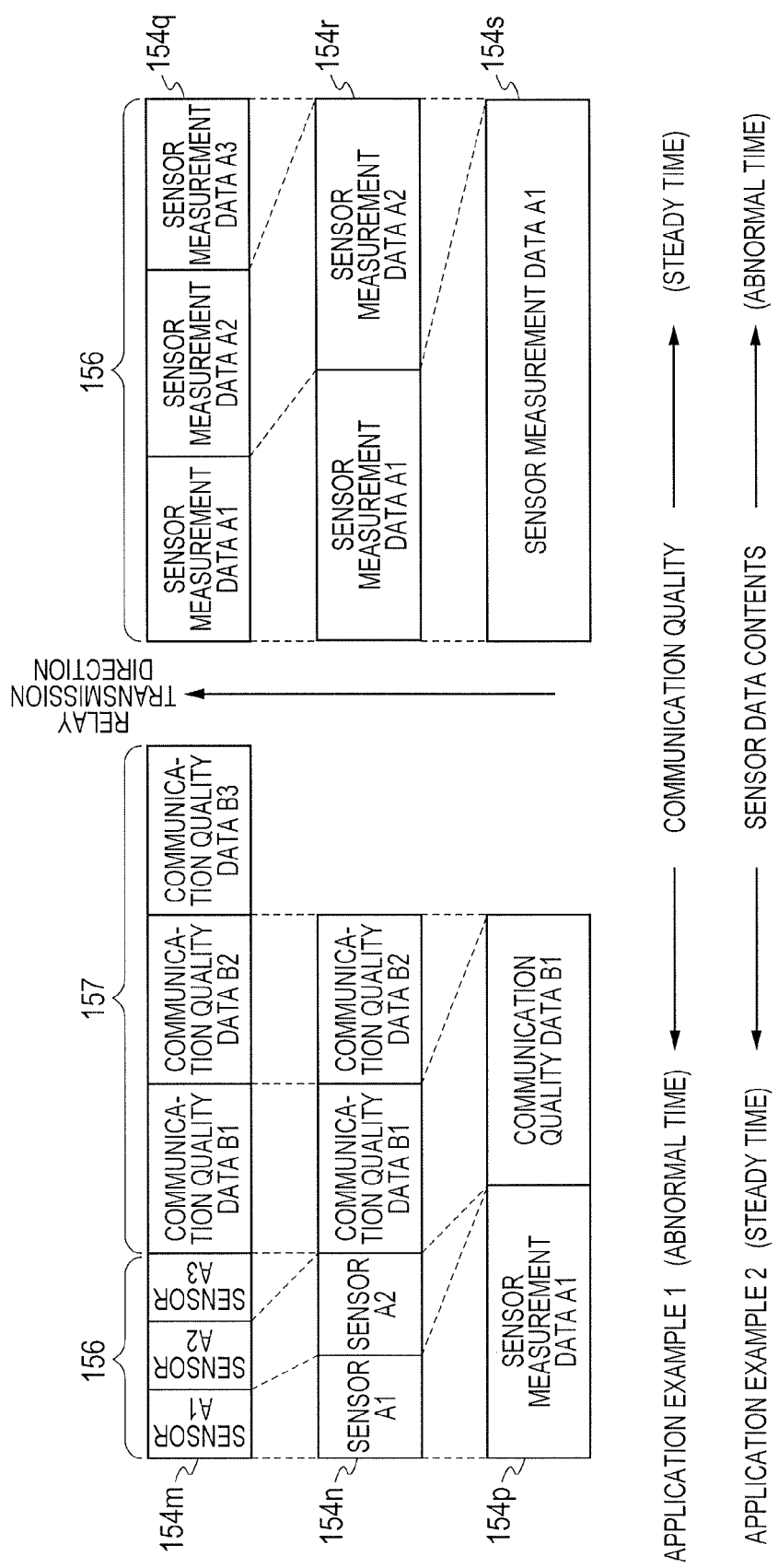

WIRELESS NETWORK SYSTEM AND WIRELESS COMMUNICATION DEVICE

CLAIM OF PRIORITY

The present application claims priority from Japanese patent application JP 2010-279604 filed on Dec. 15, 2010, the content of which is hereby incorporated by reference into this application.

FIELD OF THE INVENTION

The present invention relates to a wireless network system, and more particularly to a wireless network system that transmits sensor data using a multihop technology.

BACKGROUND OF THE INVENTION

In recent years, with a remarkable improvement of a computer performance, a communication performance required for a network communication that connects among multiple computers has been also remarkably improved. In the network communication, computers are connected with each other by the aid of cables, and a request for improvement of the performance has been met by increasing the number of cables. However, under the existing circumstances, in facilities of an industrial infrastructure field such as large-scaled manufacturing line factories or plants, a total laying length of network communication cables to be used becomes a few km, and the installation, maintenance, and management of the cables have been high in the degree of difficulty and the costs.

In order to solve problems on the installation of the cables, a communication network using a wireless communication technology has been expected. However, the wireless communication is low in disturbance tolerance in a cable communication and in the stability from the viewpoint of a communication environment change. Accordingly, the probability of failure in the wireless communication becomes high as compared with the cable communication. Also, in the wireless communication, because multiple communication devices share the same space, electric waves may influence each other and interfere with each other to deteriorate the communication performance.

That is, the communication performances represented by a bit error rate (transmission error rate per one bit of data), a latency (delay time necessary for data transmission), and a throughput (rate for data transmission) in the wireless communication network may be deteriorated with a temporal or spatial change of the electric wave environment, and data transmission in the wireless communication become unstable (that is, reliability of data transmission is reduced). In the industrial infrastructure field, particularly, because the high stability and reliability of the data transmission are required, the securement of reliability becomes a barrier to wireless communication network introduction.

As described above, as means for solving the instability of the wireless communication network, there has been proposed a multihop transmission technology in which multiple relay are arranged between the wireless communication devices (for example, combination of a communication terminal which is a data source with an access point which is a data destination), and data is transferred through the relays.

In the multihop transmission technology, when data is wirelessly transferred between the communication terminal and the access point, plural kinds of relays, wireless transfer paths, and radio channels (frequencies) to be selected can be selected. For that reason, even if a wireless communication environment of one relay, one wireless transfer path, or one radio channel is unstable, and the wireless communication performance is low, another relay, another wireless transfer path, or another radio channel can selected to stabilize data transmission between the communication terminal and the access point.

A general purpose of the multihop transfer technology is to optimize selection of the relay and the wireless transfer path so as to conduct data transmission between the terminal and the access point with high reliability and stability and efficiently.

Also, as a method for stabilizing a one-to-one wireless communication between the respective wireless communication devices using the multihop transfer technology, there have been proposed redundancy methods such as retransmission control for transmitting the same data plural times until the data arrives at a destination, and encoding control for adding an error correcting code to the data. A redundancy device increases the amount of transmission of given data to improve the reliability and stability of the wireless communication.

On the other hand, as a method for stabilizing the wireless communication, there has been proposed a method in which data is compressed, and a time required for the wireless communication is shortened, to thereby improve the stability. An influence of disturbance on the wireless communication may be reduced more as one wireless communication time is shorter. Further, that the time required for the wireless communication is shortened enables a power consumption to be reduced because an operating time of the wireless communication device can be shortened.

Hereinafter, a description will be given of an example of the multihop transfer technology, and the method of stabilizing the wireless communication including data compression.

For example, a method of compressing data according to a communication state has been disclosed (for example, refer to JP-A-Hei7 (1995)-203053). In the method of JP-A-Hei7 (1995)-203053, data to be transmitted is classified into video data and other data (control data, emergency message data, audio data, and general data). Also, a communication quality is determined according to a level of the received data or received electric wave. When it is determined that the communication quality is low, the video data is compressed and the other data is made redundant on the basis of the classified results whereby the method of JP-A-Hei7 (1995)-203053 ensures the communication reliability of the other data even if the video data is sacrificed.

SUMMARY OF THE INVENTION

An object of the present invention is to improve a communication performance indicated by an index such as a bit rate error, a latency, or a throughput, thereby improving the reliability and stability of wireless data transmission while suppressing a power consumption in the respective wireless communication devices.

In a wireless communication network including multiple wireless communication devices, in order to transmit data from one terminal to one access point, the data can be wirelessly transferred (multihop transferred) through a relay. For that reason, multiple wireless transfer paths or wireless frequency channels can be selected, thereby enabling the reliability and stability in transmission of data to be enhanced. Also, in the wireless communication between the individual wireless communication devices, communication data is compressed to shorten the communication data whereby the reliability and stability for transmitting the data are enhanced while suppressing the power consumption in the respective wireless communication devices.

In a technology for improving the reliability of the wireless communication due to compression and redundancy of the communication data, the related art conducts the compression and redundancy of the communication data on the basis of criteria related to a wireless communication status between the wireless communication devices, to thereby improve the reliability, as disclosed in JP-A-Hei7 (1995)-203053.

However, in the real wireless communication network including the multihop transfer, not only the communication terminal but also the relay may have a function of the communication terminal, and add data. Further, data indicative of a communication quality in the wireless communication network also needs to be transmitted to the access point while being added with data along all of transfer paths between the communication terminal and the relay.

For that reason, in order to enhance the reliability and stability of the data transmission in the multihop wireless network, there is required a method in which the communication status is grasped according to the wireless transfer path, and data is compressed according to the communication status of the respective wireless transfer paths.

Further, as application of the wireless communication network system, for example, when the wireless communication network system is used as a security alarm system in which a sensor of the communication terminal functions as an open/close sensor of a window, not compression of data according to the wireless communication status but the data compression according to the content of sensor data may be required.

For that reason, the present invention has been made to solve the above problem on the related art, and therefore an object of the present invention is to provide a wireless communication device and a wireless communication network, which determines (compresses) an optimum amount of data for transmission according to wireless communication quality data or sensor measurement data to realize an improvement in the reliability of the wireless communication and a reduction in the power consumption in a system that enables optimum path selection and wireless frequency channel selection using the multihop wireless network.

A typical aspect of the present invention will be described below. That is, there is provided a wireless network system having multiple wireless communication devices, and an access point connected to each of the wireless communication devices, in which each of the wireless communication devices includes a sensor processing unit that generates sensor data including a measurement result acquired by a sensor provided in each of the wireless communication devices, a communication measurement unit that generates communication quality data including a state of communication for transmitting a packet from each of the wireless communication devices, a compression determination unit that determines compression rates of the generated sensor data and the generated communication quality data according to the contents of the generated communication quality data, a compression unit that compresses the generated sensor data and the generated communication quality data according to the compression rates determined by the compression determination unit, and a wireless communication unit that transmits a packet including the sensor data and the communication quality data which are compressed by the compression unit to another of the wireless communication devices or the access point, in which the wireless communication unit of a first wireless communication device among the wireless communication units receives a first packet transmitted from a second wireless communication device among the wireless communication devices, in which the compression determination unit of the first wireless communication device determines the compression rates of a first sensor data including the sensor data included in the first packet and the sensor data generated by the sensor processing unit of the first wireless communication device, and a first communication quality data including the communication quality data included in the first packet and the communication quality data generated by the communication measurement unit of the first wireless communication device according to one of the contents of the first sensor data and the contents of the first communication quality data, in which the compression unit of the first wireless communication device compresses the first sensor data and the first communication quality data at the compression rates determined by the compression determination unit of the first wireless communication device, and in which the wireless communication unit of the first wireless communication device transmits a second packet including the first sensor data and the first communication quality data which are compressed by the compression unit to a third wireless communication device or the access point.

According to the aspect of the present invention, the reliability and stability of a communication can be improved with a low electric power without any deterioration of a communication performance.

BRIEF DESCRIPTION OF THE DRAWINGS

FIG. 2 is an illustrative view illustrating a packet communicated over a link in the wireless communication network according to the first embodiment of the present invention;

FIG. 3 is an illustrative view illustrating compression of data/commands in the wireless communication network according to the first embodiment of the present invention;

FIG. 4 is an illustrative view illustrating the data/commands transmitted by a sensor node or a relay according to the first embodiment of the present invention;

DETAILED DESCRIPTION OF THE PREFERRED EMBODIMENTS

Hereinafter, a wireless communication device and a wireless communication network according to the present invention will be described in detail with reference to several embodiments illustrated in the attached drawings.

First Embodiment

Figure 1:
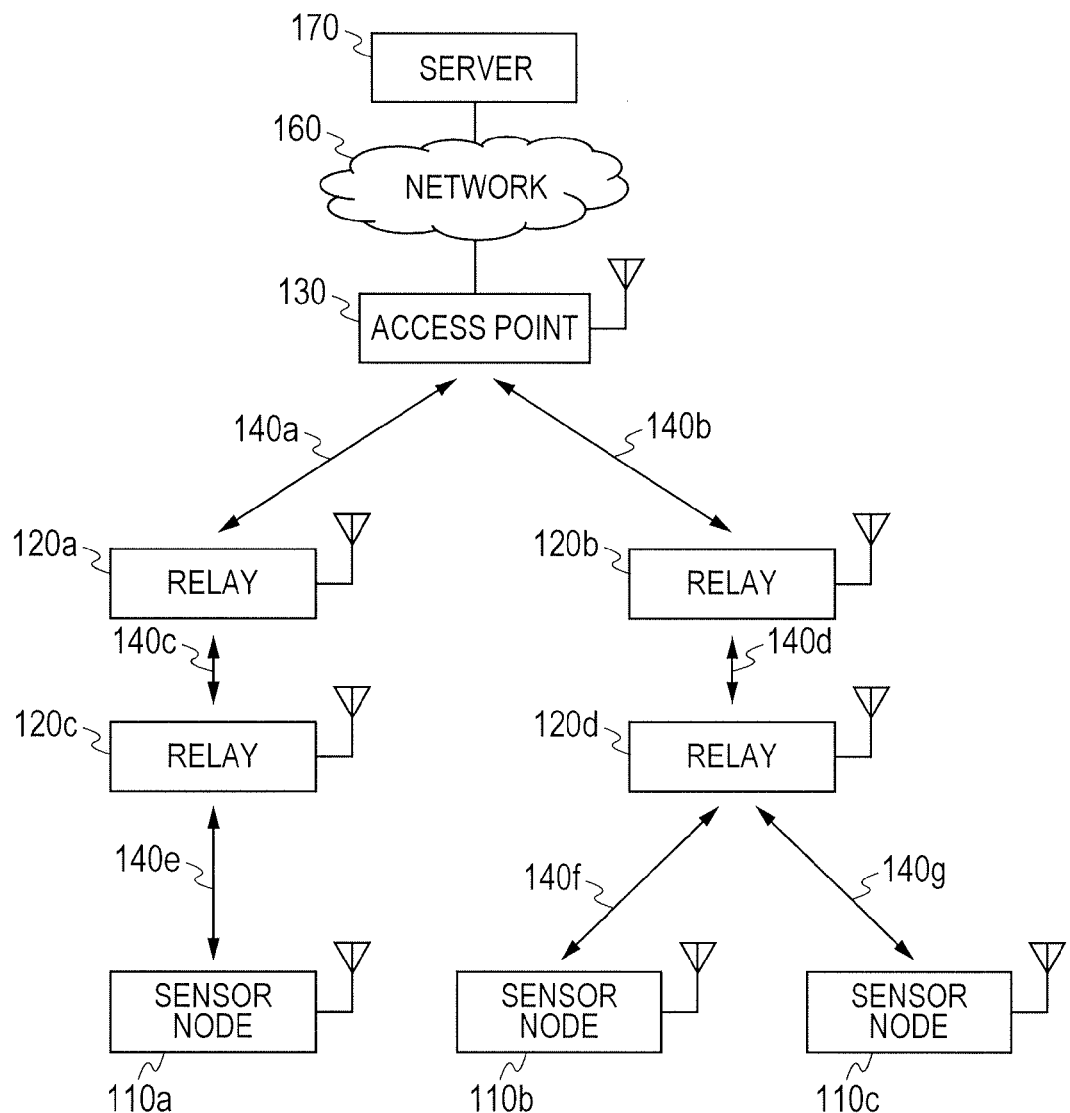
FIG. 1 is a block diagram illustrating a configuration of a wireless communication network according to a first embodiment of the present invention.

FIG. 1 is a block diagram illustrating a configuration of a wireless communication network 100 according to a first embodiment of the present invention The wireless communication network 100 includes a sensor node 110 (110a, 110b, and 110c), a relay 120 (120a, 120b, 120c, and 120d), an access point 130, a network 160, and a server 170. In the following description, the sensor node 110, the relay 120, and the access point 130 will be called "wireless communication device".

Each of the sensor node 110, the relay 120, and the access point 130 is a computer including a processor, a memory, an auxiliary storage device, and a network interface. The processor provided in each of the sensor node 110, the relay 120, and the access point 130 implements the respective functions by executing programs retained in a memory provided in each processor.

Further, the sensor node 110 or the relay 120 is equipped with a sensor device for measuring a physical amount such as a temperature, a pressure, or a flow rate, or a sensor device for receiving a message indicative of an abnormal state such as an error.

In the wireless communication network 100, the sensor node 110 has various sensor functions, and measures sensing data by the sensor functions thereof to generate sensor measurement data. Then, the sensor node 110 wirelessly transmits the generated sensor measurement data to the access point 130.

The sensor node 110 transmits the sensor measurement data through a method of transmitting the sensor measurement data to the relay 120 via multiple the relays 120 in a stepwise fashion, or through a method of transmitting the sensor measurement data directly the access point 130 from the sensor node 110.

Also, the sensor node 110 may have the same function as that of the relay 120. That is, the sensor node 110 may receive the sensor measurement data from another sensor node 110, and wirelessly transmit the received sensor measurement data and the sensor measurement data generated by its own sensor function to the access point 130 or the relay 120 connected to the access point 130.

The relay 120 and the access point 130 receive the sensor measurement data from at least one of the sensor node 110 and the relay 120.

The relay 120 may have the sensor function provided in the sensor node 110. That is, the relay 120 may receive the sensor measurement data from the sensor node 110 or another relay 120, wirelessly transmit the received sensor measurement data to the access point 130 or the relay 120 connected to the access point 130, and also wirelessly transmit the sensor measurement data generated by its sensor function to the access point 130 or the relay 120 connected to the access point 130.

The access point 130 receives the sensor measurement data and the communication quality data from the sensor node 110 or the relay 120, and transmits the sensor measurement data to the server 170 through the network 160.

In this embodiment, wireless communications that connect the sensor node 110, the relay 120, and the access point 130 to each other are called "links 140". In FIG. 1, a sensor node 110a and a relay 120c are connected to each other by a link 140e, the 120c and a relay 120a are connected to each other by a link 140c, and the relay 120a and the access point 130 are connected to each other by a link 140a. Also, a sensor node 110b and a relay 120d are connected to each other by a link 140f, a sensor node 110c and the relay 120d are connected to each other by a link 140g, the relay 120d and a relay 120b are connected to each other by a link 140d, and the relay 120b and the access point 130 are connected to each other by a link 140b.

In each link 140, a state, an environment, or a performance of the wireless communication is measured as a quality of the communication. Indexes of the communication quality include, for example, an RSSI, the number of retransmissions, the number of CCAs, the number of acknowledges, and latency. The wireless communication device of the link, that is, the wireless communication device to which data is transmitted measures the communication quality data according to the index of the communication quality.

The RSSI (Received Signal Strength Indicator) represents a power strength when receiving a wireless frequency. The number of retransmissions represents the number of transmissions repeated until the transmitted data arrives at the linked wireless communication device (the relay 120 or the access point 130 in an uplink, and the relay 120 or the sensor node 110 in a downlink).

The number of CCAs (Channel Clear Assessments) represents the number of cases in which it is determined that the same radio wave is used, and transmission is suspended in determination (carrier sense) of whether the same radio wave is used in another wireless communication device, or not, before the wireless communication starts.

The number of acknowledges represents the number of times when the linked wireless communication device returns an acknowledge signal indicating that the linked wireless communication device receives data transmitted to itself to a source of data. The latency represents a delay time of a time when the linked wireless communication device receives the data with respect to a given period of transmission in the case where the data is transmitted in the period.

The linking wireless communication device, that is, the wireless communication device of the data source (the sensor node 110 or the relay 120 in the uplink, and the relay 120 in the downlink) can measure the number of retransmissions, the number of CCAs, and the number of acknowledges among the above-mentioned indexes of the communication quality as the communication quality data. Also, the linked wireless communication device, that is, the wireless communication device of the data destination (the relay 120 in the uplink, and the sensor node 110 or the relay 120 in the downlink) can measure the RSSI and the latency among the above-mentioned indexes of the communication quality as the communication quality data.

In this embodiment, a direction of transmitting data from the sensor node 110 to the access point 130 through the relay 120 is called "uplink" whereas a direction of transmitting data from the access point 130 to the sensor node 110 through the relay 120 is called "downlink".

The uplink according to this embodiment allows the sensor measurement data or the communication quality data to be transmitted. Also, the downlink according to this embodiment allows a communication command including a command for switching a channel or a path, or a time command for temporally synchronizing all of the wireless communication devices within the wireless communication network 100 to be transmitted from the access point 130.

The network 160 is a wide area communication network such as an internet or a cellular network. The server 170 is connected to the access point 130 through the network 160, and processes the sensor measurement data transmitted from the access point 130. The server 170 may be a server group arranged in a data center.

FIG. 2 is an illustrative view illustrating a packet 150 communicated over the link 140 in the wireless communication network 100 according to the first embodiment of the present invention.

The packet 150 includes a preamble 151, an SFD (start of flame delimiter) 152, a header 153, a data/commands 154, and a CRC (cyclic redundant check) 155.

The preamble 151 is a signal for allowing the wireless communication device that is a receiver side of the link 140 to be synchronized with the transmitted packet 150. The SFD 152 is a signal indicating that a signal subsequent to the SFD 152 is data contents in the packet 150.

The header 153 represents an attribute of the data contents of the packet 150, source information, and destination information. The data/commands 154 are the data contents of the packet 150. The CRC 155 is a signal for checking whether the wireless communication device that is the receiver side of the packet 150 could precisely receive the data contents of the packet 150, or not.

In the uplink, sensor measurement data 156 or communication quality data 157 are frequently stored in the data/commands 154. In the sensor measurement data 156 is stored the sensor measurement data generated by the sensor node 110 or the relay 120, and in the communication quality data 157 is stored the communication quality data measured by the sensor node 110 or the relay 120.

Also, in the downlink, a command 158 and command data 159 are frequently stored in the data/commands 154. In the command 158 is stored a command for time synchronization, or a communication command for switching the wireless communication path or the channel. Also, in the command data 159 is stored a numerical value designated by the command stored in the command 158.

FIG. 3 is an illustrative view illustrating compression of the data commands 154 in the wireless communication network 100 according to the first embodiment of the present invention.

The sensor node 110 or the relay 120 according to the first embodiment differently compresses the sensor measurement data 156 and the communication quality data 157 stored in the data/commands 154 of the packet 150 according to an application used in the wireless communication network 100. Data/commands 154e, 154f, 154g, 154h, and 154k in FIG. 3 exemplify the data/commands 154 compressed by the method of the first embodiment.

In the wireless communication device of the related art, the sensor measurement data is mainly wirelessly transmitted, and when the communication quality data is transmitted, the amount of data as large as the communication quality data is increased to lengthen a length of the packet 150. On the other hand, because the wireless communication device is generally liable to be affected by disturbance, there is no arrive of data, or an error occurs in received information, to thereby deteriorate the reliability and the stability.

As a method of improving the reliability and stability of the wireless communication by the packet 150, there are conceivable a method of encoding data (error correction code) to enhance the redundancy, and a method of compressing data to shorten the length of the packet 150. When the method of shortening the length of the packet 150 is applied to the wireless communication system, a time required for transmission and reception can be reduced, and the power consumption of the wireless communication network 100 can be also reduced.

As a first example of an application (hereinafter referred to as "first application") used in the wireless communication network 100, there is an application for measuring a state of a facility or environment provided in the sensor node 110 or the relay 120, such as power monitoring or preventive maintenance. In the application of the power monitoring, the sensor node 110 or the relay 120 measures the power consumption of a building, and the sensor node 110 or the relay 120 periodically wirelessly transmits the sensor measurement data.

In the application of the preventive maintenance, the sensor node 110 or the relay 120 measures an operational status of equipment. Then, the sensor node 110 or the relay 120 periodically wirelessly transmits the sensor measurement data.

The first application is required to steadily transmit the sensor measurement data 156. For that reason, in the wireless communication network 100 using the first application, when the wireless communication quality (quality indicated by the communication quality data 157) is high, the sensor node 110 or the relay 120 does not compress the sensor measurement data 156 as with the data/commands 154e. As a result, all of the sensor measurement data 156 can be transmitted with the aid of the packet 150.

However, in the wireless communication network 100 using the first application, when the wireless communication quality (quality indicated by the communication quality data 157) is low, the sensor node 110 or the relay 120 changes the compression rate of the sensor measurement data 156 according to the deterioration of the communication quality. As a result, the amount of communication quality data 157 is increased more as the communication quality is deteriorated more like data/commands 154f, 154g, 154h, and 154k. When the communication quality is lowest, the sensor node 110 or the relay 120 may delete the sensor measurement data 156 and transmit only the communication quality data 157 as with the data/commands 154k.

When the communication quality is deteriorated, the communication quality data 157 indicating that the communication quality is deteriorated is transmitted to the access point 130, and it is determined by the access point 130 whether a change in the transfer path of the wireless communication or a change in the wireless communication frequency channel is necessary, or not. When the communication quality is improved by the change in the transfer path of the wireless communication, or the change in the wireless communication frequency channel, the sensor node 110 or the relay 120 decreases the compression rate of the sensor measurement data 156 included in the data contents of the packet 150.

The method in which the access point 130 determines the change in the transfer path of the wireless communication or the change in the wireless communication frequency channel, and the access point 130 transmits a changeover command for changing on the basis of the determination result is called "central control method". On the other hand, a procedure of switching one channel to another for each link 140 is called "central control method".

As a second example of application (hereinafter referred to as "second application") of the application used in the wireless communication network 100, there is an application for detecting an abnormal state such as security, warning, emergency reports, or abnormality monitoring. In the second application, when the sensor measurement data 156 measured by the sensor node 110 or the relay 120 represents a steady state, it may be detected by the access point 130 that the link 140 of the wireless communication is normally maintained. That is, the transmission of the communication quality data 157 is important.

For that reason, when the sensor measurement data 156 represents the steady state, the sensor node 110 or the relay 120 in the second application have no need to transmit the sensor measurement data 156. On the other hand, only when the sensor measurement data indicative of the abnormality such that warning is generated is detected, it is important to transmit the sensor measurement data 156 indicating that the abnormality occurs toward the access point 130.

For that reason, when the sensor measurement data 156 represents the steady state, the sensor node 110 or the relay 120 does not compress the communication quality data 157 as with the data/commands 154*k*. As a result, the sensor node 110 or the relay 120 can wirelessly transmit all of the communication quality data 157.

Also, when the sensor measurement data 156 represents the abnormal state, the sensor node 110 or the relay 120 increases the amount (length) of sensor measurement data 156 by changing the compression rate of the communication quality data 157 according to the degree of measured abnormality. When the measured sensor measurement data represents the most serious abnormal state, the sensor node 110 or the relay 120 may compress the communication quality data 157 as with the data/commands 154*e*.

Also, in the wireless communication network 100 using the second application, when the measured sensor measurement data represents the steady state, and the communication quality within the wireless communication network 100 is deteriorated, it is important to transmit the communication quality data 157. That is, as in the wireless communication network using the first application, in the wireless communication network 100 using the second application, when the communication quality within the wireless communication network 100 is deteriorated, the compression is conducted as with the data/commands 154*k*.

When the communication quality is improved by changing the transfer path or the radio channel by the access point 130 that has received the communication quality data 157, the compression rate of the sensor measurement data 156 is increased.

(Method of Compressing Sensor Measurement Data 156 and Communication Quality Data 157)

Hereinafter, a method of compressing the sensor measurement data 156 and the communication quality data 157 will be described.

A method of compressing the communication quality data 157 according to this embodiment will be described below. In this embodiment, when the compression rate is high, data stored in the data/commands 154 is more reduced.

For example, there is one compressing method in which, when data of plural indexes such as the RSSI value, the number of CCAs, the number of retransmissions, or the number of acknowledges is stored in the communication quality data 157, higher priorities are allocated to indexes higher in need to reduce indexes lower in priority stored in the communication quality data 157.

Also, there is another compression method in which when the latest measured data and the measurement data generated in the past plural measurements are stored in the communication quality data 157, the lower priorities are allocated to the stored past measurement data, and the data is reduced in an ascending order of priority, that is, in the order from the older data. Also, there is another compression method in which only difference information from the past measurement data is stored in the communication quality data 157.

Also, there is another compression method in which when subsequent communication quality data can be predicted such that a variation in the communication quality data to be measured is periodic, the amount of data to be stored in the communication quality data 157 is deleted by using a predicted value.

A method of compressing the sensor measurement data 156 is also identical with the method of compressing the communication quality data 157. That is, as the method of compressing the sensor measurement data 156, there is a compressing method in which when plural kinds of sensor measurement data (for example, temperature, pressure, or error message) is stored in the sensor measurement data 156, lower priorities are allocated to the kinds of data lower in need to reduce the sensor measurement data of the kind lower in priority.

Also, as the method of compressing the sensor measurement data 156, there is another compressing method in which when the past plural sensor measurement data is stored, the lower priorities are allocated to the stored past sensor measurement data, and data is reduced in the ascending order of priority, that is, in the order from the older data.

Further, there is another compressing method in which only difference information from the past sensor measurement data is stored in the sensor measurement data 156, or another compressing method in which only the predicted value of the sensor measurement data is stored in the sensor measurement data 156.

Further, when the compression rate of the communication quality data 157 is determined according to the value stored in the communication quality data 157, the sensor node 110 or the relay 120 may hold an upper limit (lower limit of the amount of compressed communication quality data 157) or a lower limit (upper limit of the amount of compressed communication quality data 157) of the compression rate according to a value (the degree of deterioration of the communication quality) stored in the communication quality data 157. Also, the sensor node 110 or the relay 120 may hold an upper limit or a lower limit of the amount of sensor measurement data 156.

Also, when the compression rate of the sensor measurement data 156 is determined according to the value stored in the sensor measurement data 156, the sensor node 110 or the relay 120 may hold an upper limit (lower limit of the amount of compressed sensor measurement data 156) or a lower limit (upper limit of the amount of compressed sensor measurement data 156) of the compression rate according to a value (the degree of abnormality) stored in the sensor measurement data 156. Also, the sensor node 110 or the relay 120 may hold an upper limit or a lower limit of the amount of sensor measurement data 156. Also, the sensor node 110 or the relay 120 may hold an upper limit or a lower limit of the amount of communication quality data 157.

In the wireless communication network 100 using the first application, the compression rate in the data/commands 154 is determined on the basis of the contents of the communication quality data 157. That is, the compression rates of the sensor measurement data 156 and the communication quality data 157 are determined according to whether the transmission of the communication quality data 157 is important, or not.

In the wireless communication network 100 using the second application, the compression rate of the data/commands 154 may be determined according to only the value stored in the sensor measurement data 156, or may be determined on the basis of both of the value stored in the sensor measurement data 156 and the value stored in the communication quality data 157.

In the wireless communication network 100 using the second application, when the compression rate of the data/commands 154 may be determined according to only the value stored in the sensor measurement data 156, if the sensor measurement data 156 is indicative of the abnormal state, the compression rate of the sensor measurement data 156 is decreased because the transmission of the sensor measurement data 156 is always important. Also, if the sensor measurement data 156 is indicative of the steady state, the compression rate of the communication quality data 157 is decreased because the transmission of the communication quality data 157 is always important.

Also, when the compression rate is determined on the basis of both of the value stored in the sensor measurement data 156 and the value stored in the communication quality data 157, if the communication quality data 157 is indicative of the steady state, the compression rate of the sensor measurement data 156 may be always decreased. Also, when the communication quality data 157 is indicative of the abnormal state, and the sensor measurement data 156 is indicative of the normal state, the compression rate of the communication quality data 157 may be decreased. When the communication quality data 157 is indicative of the abnormal state, and the sensor measurement data 156 is indicative of the normal state, the compression rate of the sensor measurement data 156 may be decreased.

FIG. 4 is an illustrative view illustrating the data/commands 154 transmitted by the sensor node 110 or the relay 120 according to the first embodiment of the present invention.

An example of the data/commands 154 illustrated in FIG. 4 is representative of the data/commands 154 in the respective wireless communication devices when the sensor node 110a generates sensor measurement data A1 and communication quality data B1, the relay 120c generates sensor measurement data A2 and communication quality data B2, and the relay 120a generates sensor measurement data A3 and communication quality data B3. The sensor measurement data A1 to A3 are stored in the sensor measurement data 156, and the communication quality data B1 to B3 are stored in the communication quality data 157.

Also, the uplink of the wireless communication network in FIG. 4 is in the stated order of the sensor node 110a, the relay 120c, the relay 120a, and the access point 130 illustrated in FIG. 1. Further, the data/commands 154 included in the packet 150 when the packet 150 is transmitted by a link e are the data/commands 154p and 154s. The data/commands 154 included in the packet 150 when the packet 150 is transmitted by a link c are the data/commands 154n and 154r. The data/commands 154 included in the packet 150 when the packet 150 is transmitted by a link 140a are data/commands 154m and 154q.

In all of the links 140 using the first application, when the communication quality data 157 is indicative of a good state, that is, when the communication quality is in the steady state, or in the sensor node 110a using the second application, when the measured sensor measurement data 156 is indicative of an abnormal value, because the transmission of the sensor measurement data 156 is important, the data/commands 154 included in the packet 150 is generated as the data/commands 154s, 154r, and 154q. That is, the communication quality data 157 is compressed by the upper limit of the compression rate with the results that the communication quality data 157 is deleted, and only the sensor measurement data 156 is transmitted.

The sensor measurement data 156 transmitted from a lower-level sensor node 110 or the relay 120 is added to the sensor measurement data 156 every time the sensor measurement data 156 is transferred between the sensor node 110 and the relay 120 in the multihop wireless network.

Also, the sensor node 110 or the relay 120 according to this embodiment holds an upper limit and a lower limit of the compression rate in each of the sensor measurement data 156 and the communication quality data 157. The sensor node 110 or the relay 120 compresses the respective data according to the upper limit and the lower limit of the held compression rate, and compresses the respective data up to the upper limit to keep the short length of the packet 150. The upper limit of the compression rate according to this embodiment is indicative of the lower limit of the compressed data length, and the lower limit of the compression rate is indicative of the upper limit of the compressed data length.

Also, the upper limit and the lower limit of the compression rate may be determined according to the values of the sensor measurement data 156 and the communication quality data 157. That is, the upper limit and the lower limit of the compression rate may be changed according to the degree of abnormality of the respective data.

The relay 120c in the second application refers to the sensor measurement data A1 measured from the sensor node 110a, and the sensor measurement data A2 measured by itself, and compresses the sensor measurement data 156 according to the lower limit of the compression rate held by itself if the contents of any sensor measurement data A are indicative of abnormality.

Similarly, the relay 120a in the second application refers to the sensor measurement data A1 and A2 measured from the sensor node 110a and the relay 120c, and the sensor measurement data A3 measured by itself, and compresses the sensor measurement data 156 according to the lower limit of the compression rate held by itself if the contents of any sensor measurement data A are indicative of abnormality.

Further, in the lowest-level link 140 using the first application, when the measured communication quality data 157 is indicative of a bad state, or in all of the sensor nodes 110 or the relays 120 using the second application, when the measured sensor measurement data 156 is indicative of a steady value, because the transmission of the communication quality data 157 is important, the data/commands 154 included in the packet 150 is generated as the data/commands 154p, 154n, and 154m. That is, the sensor measurement data 156 is compressed by the upper limit or a higher value of the compression rate, and the communication quality data 157 is compressed by the lower limit of the compression rate.

The sensor measurement data 156 and the communication quality data 157 which have been transmitted from a lower-level sensor node 110 or the relay 120 is added to the sensor measurement data 156 and the communication quality data 157 every time the sensor measurement data 156 and the communication quality data 157 are transferred in the multihop wireless network.

Also, when the sensor measurement data 156 exceeds a given length of the packet 150 even if the relay 120a compresses the sensor measurement data 156 by the upper limit of the compression rate, the relay 120a lengthens the length of the packet 150, to thereby store the compressed communication quality data 157 and the compressed sensor measurement data 156 into the packet 150.

Also, when the compression rates of the sensor measurement data 156 and the communication quality data 157 are changed according to the contents of the sensor measurement data 156 and the communication quality data 157, if the transmission of the sensor measurement data 156 is important, the upper limit of the compression rate of the sensor measurement data is held to a lower value. Also, if the transmission of the sensor measurement data 156 is important, the upper limit of the compression rate of the sensor measurement data 156 is held to a lower value.

A process of compressing the respective data/commands 154 will be described later.

In FIG. 4, the compression status is illustrated assuming that all of the communication quality data 157 transmitted in the multihop wireless communication indicate the same degree of communication quality. However, the communication quality of the link 140 in the wireless communication network 100 according to the present invention is different among the links 140.

As described above, according to this embodiment, the sensor measurement data and the communication quality data are transmitted by an optimum amount of data according to a value of the sensor measurement data 156 or the communication quality data 157, thereby enabling the wireless communication network 100 high in reliability and low in power to be realized.

Figure 5:
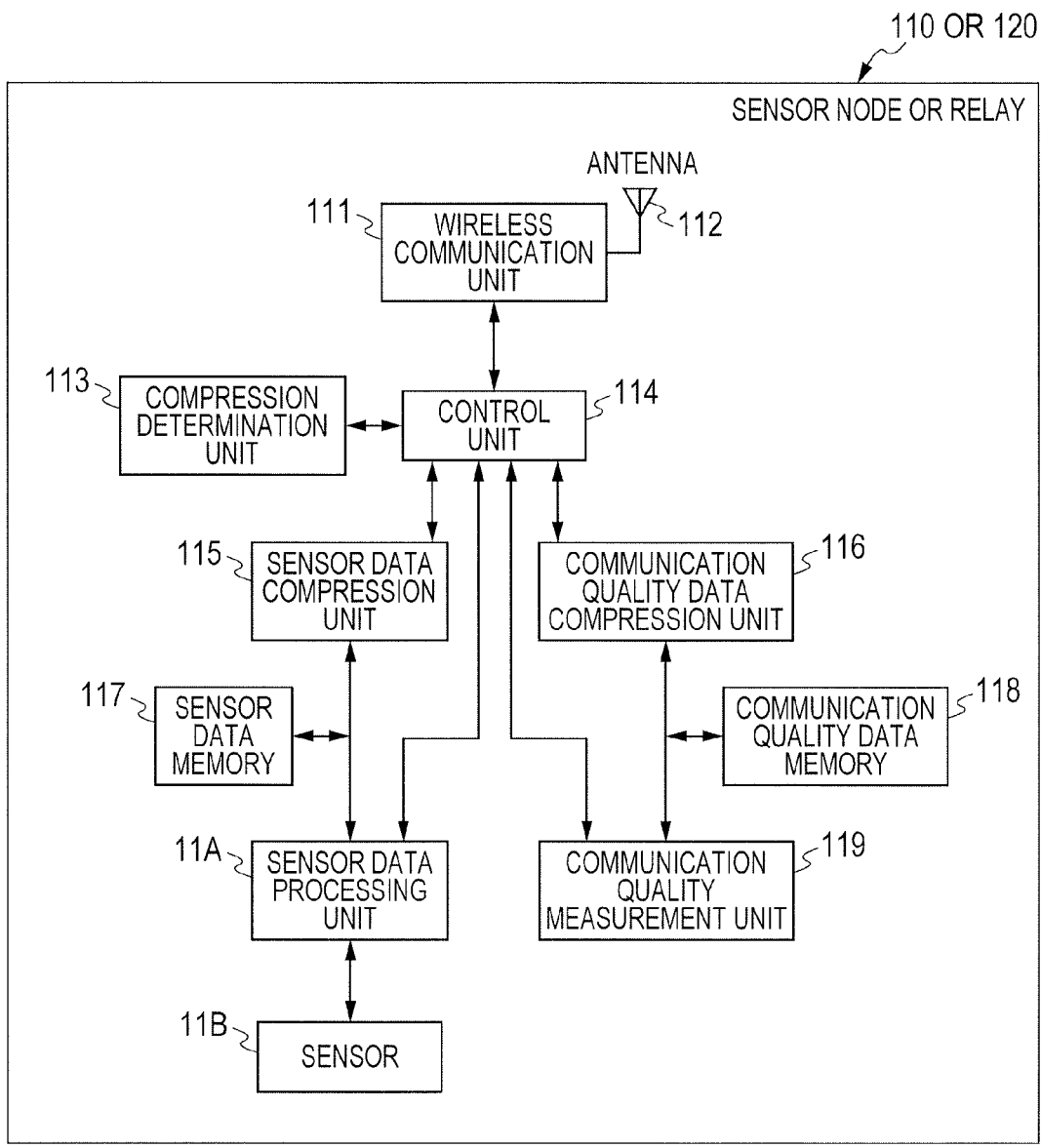
FIG. 5 is a block diagram illustrating a logical configuration of the sensor node and the relay according to the first embodiment of the present invention.

FIG. 5 is a block diagram illustrating a logical configuration of the sensor node 110 and the relay 120 according to the first embodiment of the present invention.

Each of the sensor node 110 and the relay 120 includes functions of a wireless communication unit 111, an antenna 112, a compression determination unit 113, a control unit 114, a sensor data compression unit 115, a communication quality data compression unit 116, a sensor data memory 117, a communication quality data memory 118, a communication quality measurement unit 119, a sensor data processing unit 11A, and a sensor 11B. Those functions are implemented by allowing a processor provided in the sensor node 110 to execute problems retained in a memory provided in the sensor node 110.

The sensor 11B has a function of a sensor device that measures an installed facility or a state of the environment, or a sensor device that receives a message, and generates, from sensing data measured by the sensor device, the sensor measurement data that can be processed by the wireless communication device of this embodiment.

The sensor data processing unit 11A has a function of acquiring the sensor measurement data by operating the sensor 11B, and storing the acquired sensor measurement data in the sensor data memory 117.

The relay 120 may not include the sensor data processing unit 11A and the sensor 11B, and may store only the received sensor measurement data in the sensor data memory 117.

Also, the sensor 11B and the sensor data processing unit 11A each have an application (corresponding to the above first application or second application) that is a processing function for acquiring the sensor measurement data. It is determined according to this application which contents of the sensor measurement data and the communication quality data are used for determining the compression rate.

The communication quality measurement unit 119 has a function of measuring the communication quality data such as the number of retransmissions, and storing the measured communication quality data in the communication quality data memory 118. The communication quality data according to this embodiment includes the communication quality of the link 140 to which the packet is to be transmitted.

The sensor data memory 117 and the communication quality data memory 118 each has a function of storing each data in an auxiliary storage device of the sensor node 110 or the relay 120.

The relay 120 may receive the packet 150 transmitted from the sensor node 110 or another relay 120 through the antenna 112 or the wireless communication unit 111, and store the communication quality data included in the packet 150 in the communication quality data memory 118.

The control unit 114 provided in each of the sensor node 110 and the relay 120 transmits, to the compression determination unit 113, the sensor measurement data and the communication quality data measured by its own sensor node 110 or relay 120, and the sensor measurement data 156 and the communication quality data 157 received from another sensor node 110 or the relay 120. Then, the control unit 114 allows the compression determination unit 113 to determine the compression rate. Then, the control unit 114 allows the sensor data compression unit 115 and the communication quality data compression unit 116 to compress each data according to the compression rate determined by the compression determination unit 113.

Also, the control unit 114 may refer to the contents of the sensor measurement data and the communication quality data, which are stored in the sensor data memory 117 and the communication quality data memory 118, and update the upper limit and the lower limit of the compression rate of the sensor measurement data and the communication quality data, which are held by the compression determination unit 113. For example, when the contents of the sensor measurement data indicate that the transmission of the sensor measurement data is important, the control unit 114 updates the upper limit and the lower limit of the compression rate of the sensor measurement data held by the compression determination unit 113 with a lower value.

Further, the control unit 114 stores each compressed data in the data/commands 154 of the packet 150 for wireless communication, and transmits, to the wireless communication unit 111, the packet 150 in which the compressed data is stored in the data/commands 154. The wireless communication unit 111 wirelessly transmits the packet 150 received from the control unit 114 through the antenna 112.

The compression determination unit 113 is connected to the auxiliary storage device, and holds a table including the compression rate of the communication quality data or the sensor measurement data. The compression rate held by the compression determination unit 113 includes the upper limit and the lower limit thereof. The compression rate held by the compression determination unit 113 may be stored in advance according to an application used by the sensor node 110 or the relay 120 having the compression determination unit 113, or may be updated according to a command transmitted from the access point 130.

Also, the compression determination unit 113 may hold identifiers uniquely indicating the applications in association with criteria indicating which data of the compression rate is determined on the basis of any one of the contents of the sensor measurement data and the communication quality data.

In this case, the control unit 114 of the sensor node 110 or the relay 120 stores the identifiers of the application used by its own the sensor data processing unit 11A and its own sensor 11B in the packet 150 to be transmitted. Then, the control unit 114 of each relay 120 extracts the identifier of the application from the received packet 150, and transmits the extracted identifier of the application to the compression determination unit 113. Alternatively, the control unit 114 of the sensor node 110 or the relay 120 may transmit the identifier of the application used by its own device to the compression determination unit 113.

Then, the compression determination unit 113 determines the criterion to be used among the criteria held in the compression determination unit 113.

Processing to be described later will be described assuming that the compression determination unit 113 holds the identifiers of the applications and the criteria corresponding to the identifiers of the applications.

The compression determination unit 113 determines the compression rate of the data to be stored in the data/commands 154 on the basis of the sensor measurement data and the communication quality data which have been transmitted from the control unit 114, and the compression rate held by itself. When the compression determination unit 113 determines the compression rate according to the identifier of the application, the compression determination unit 113 selects the criterion for indicating whether the compression rate is determined according to the contents of the sensor measurement data, or the contents of the communication quality data.

When plural kinds of data is included in the sensor measurement data and the communication quality data, and the priorities are allocated to kinds of the respective data, the sensor data processing unit 11A and the communication quality measurement unit 119 may add the identifiers indicating the kind of data to each data included in the measured sensor measurement data and the communication quality data. In this case, the sensor data compression unit 115 and the communication quality data compression unit 116 hold the priorities of deletion to the kinds of data in advance, and delete the data in an ascending order of the priority according to the priorities held in advance when compressing the sensor measurement data and the communication quality data.

Also, when the priorities are allocated to the kinds of respective data, the sensor data processing unit 11A and the communication quality measurement unit 119 may add the values indicative of the priorities to the respective data included in the measured sensor measurement data and the communication quality data. In this case, the sensor data compression unit 115 and the communication quality data compression unit 116 delete the data in the ascending order of the priorities added to the respective data when compressing the sensor measurement data and the communication quality data.

Figure 6:
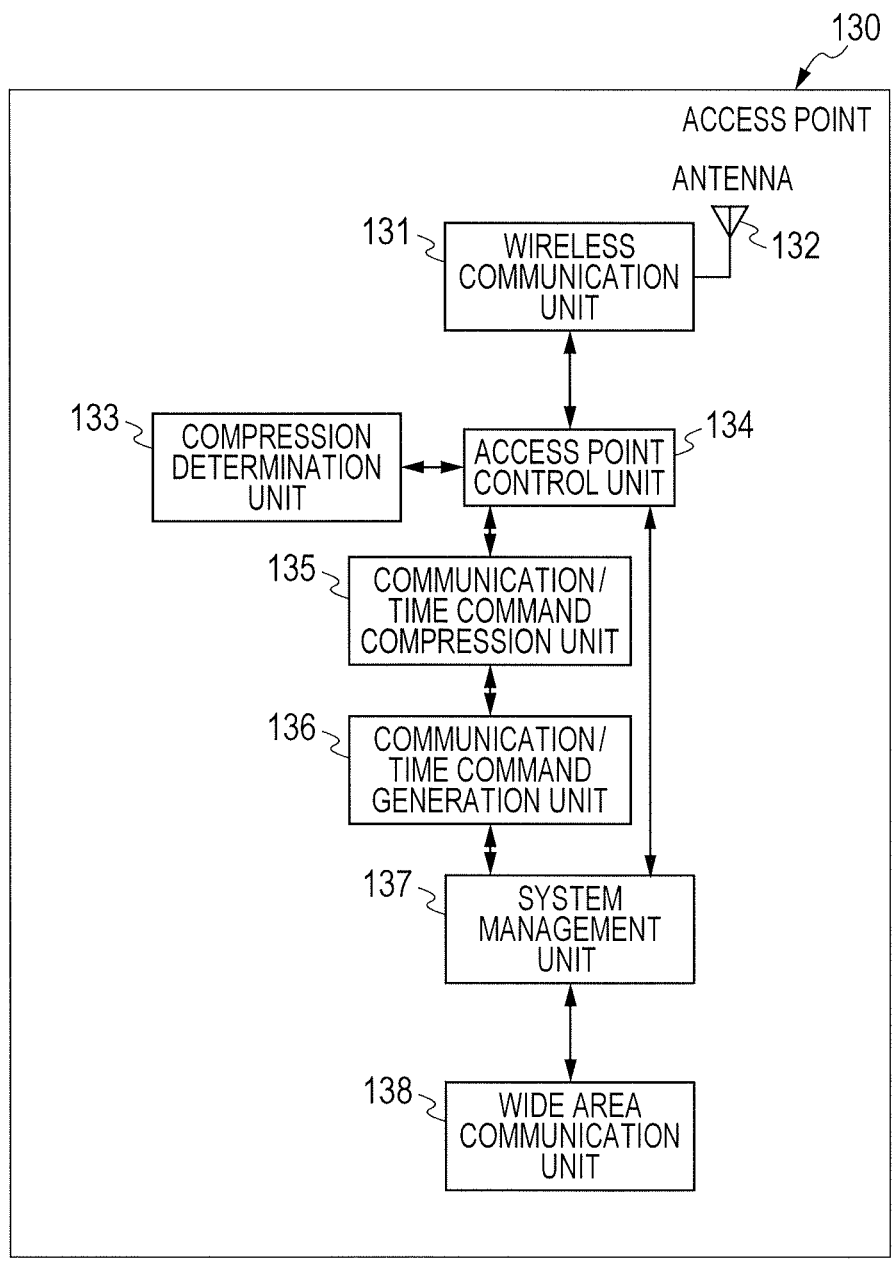
FIG. 6 is a block diagram illustrating a logical configuration of an access point according to the first embodiment of the present invention.

FIG. 6 is a block diagram illustrating a logical configuration of the access point 30 according to the first embodiment of the present invention.

The access point 130 includes functions of a wireless communication unit 131, an antenna 132, a compression determination unit 133, an access point control unit 134, a communication/time command compression unit 135, a communication/time command generation unit 136, a system management unit 137, and a wide area communication unit 138.

The sensor measurement data and the communication quality data included in the packet 150 transmitted from the sensor node 110 or the relay 120 is transmitted to the antenna 132, the wireless communication unit 131, and also transmitted to the system management unit 137 through the access point control unit 134.

The system management unit 137 transmits the sensor measurement data to the server 170 through the network 160. Also, the system management unit 137 determines an optimum multihop wireless path in the wireless communication network 100, or an optimum radio frequency channel for each link 140, on the basis of the received communication quality data.

According to the result determined by the system management unit 137, the communication/time command generation unit 136 generates a communication command for switching one channel or path to another, or a time command for synchronizing the time.

The communication/time command compression unit 135 compresses the command generated by the communication/time command generation unit 136 at the compression rate determined according to the communication quality data received from the sensor node 110 or the relay 120.

The compression determination unit 133 holds the compression rate of data according to the application, and selects the criterion for compression as with the compression determination unit 113 of the sensor node 110 or the relay 120.

The access point control unit 134 wirelessly transmits the command compressed by the communication/time command compression unit 135 to the relay 120 or the sensor node 110 through the wireless communication unit 131 and the antenna 132. Then, the relay 120 or the sensor node 110 executes changeover of the multihop radio path, changeover of the channel, or the synchronization processing of the time on the basis of the command received from the access point 130.

Figure 7:
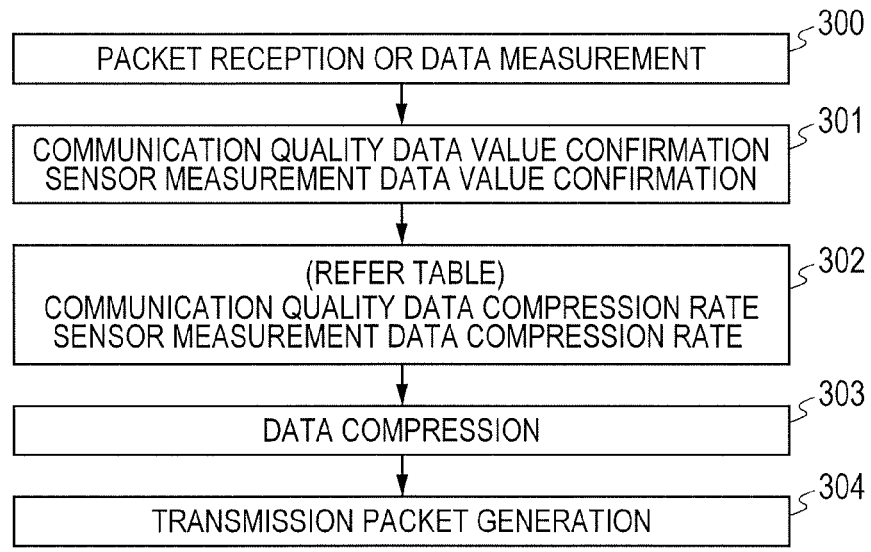
FIG. 7 is a flowchart illustrating a process of compressing the data/commands in the sensor node or the relay according to the first embodiment of the present invention.

FIG. 7 is a flowchart illustrating a process of compressing the data commands 154 in the sensor node 110 or the relay 120 according to the first embodiment of the present invention.

In estimating the sensor measurement data and the communication quality data, the sensor node 110 starts the processing illustrated in FIG. 7. Also, in receiving the packet 150 from the sensor node 110 or the relay 120, the relay 120 starts the processing illustrated in FIG. 7 (300).

The compression determination unit 113 holds a given length of the data/commands 154 (that is, the amount of data/commands 154) in the following processing in advance.

After Step 300, the sensor node 110 or the relay 120 refers to the values stored in the sensor measurement data and the communication quality data (301).

More specifically, in Step 301, after the sensor measurement data and the communication quality data, which have been measured by the sensor 11B of the sensor node 110 per se and the communication quality measurement unit 119, respectively, have been transmitted from the control unit 114, the compression determination unit 113 of the sensor node 110 refers to the transmitted sensor measurement data and communication quality data. Also, in Step 301, after the sensor measurement data and the communication quality data, which have been transmitted from the sensor node 110 or another relay 120, and the sensor measurement data and the communication quality data, which have been measured by the sensor 11B of the sensor node 110 per se and the communication quality measurement unit 119, respectively, have been transmitted from the control unit 114, the compression determination unit 113 of the sensor node 110 refers to the transmitted sensor measurement data and communication quality data.

After Step 301, the compression determination unit 113 refers to the table of the compression rate held by the compression determination unit 113, and determines the compression rates of the sensor measurement data and the communication quality data (302).

In more detail, in Step 302, the compression determination unit 113 selects the criterion on the basis of the identifier of the application transmitted from the control unit 114 to select data that is the criterion for determination of the compression rate. Then, the compression determination unit 113 determines the compression rates of the sensor measurement data and the communication quality data.

For example, when the identifier of the application represents the identifier of the above-mentioned first application, the compression determination unit 113 selects the criterion indicating that the compression rate is determined on the basis of the communication quality data. Then, when data indicating that the communication quality is low is included in the communication quality data, the compression determination unit 113 sets the compression rate of the communication quality data to the lower limit of the compression rate of the communication quality data.

Then, the compression determination unit 113 calculates the remaining length of the data/commands 154 when the communication quality data is compressed, according to the lower limit of the compression rate, and determines the compression rate of the sensor measurement data so that the sensor measurement data is stored in the remaining length of the data/commands 154. In this situation, if the sensor measurement data is stored in the remaining length of the data/commands 154, the compression rate of the sensor measurement data may be set to the upper limit, or may be set to a value lower than the upper limit.

In this case, when the compression rate of the sensor measurement data exceeds the upper limit of the compression rate of the sensor measurement data, the compression determination unit 113 may determine the compression rate of the communication quality data so as to exceed a given length of the data/commands 154. That is, as a result of compressing the sensor measurement data with the upper limit of the sensor measurement data, when the length of the data/commands 154 exceeds the given length, the compression determination unit 113 may compress the sensor measurement data by the upper limit. As a result, although the length of the packet 150 is lengthened, necessary data is transmitted.

When the length of the data/commands 154 exceeds the given length, the compression rate of the communication quality data whose transmission is important may be set to a value higher than the lower limit. As a result, the length of the packet 150 is maintained to the given value to realize a communication high in reliability.

Also, for example, when all of the communication quality data indicate that the communication quality is high in the case where the identifier of the application represents the identifier of the above-mentioned first application, the compression determination unit 113 sets the compression rate of the sensor measurement data to the lower limit of the compression rate of the sensor measurement data.

Then, the compression determination unit 113 calculates the remaining length of the data/commands 154 with the lower limit of the compression rate when the sensor measurement data is compressed, and determines the compression rate of the communication quality data so that the communication quality data is stored in the calculated remaining length of the data/commands 154. In this situation, if the communication quality data is stored in the remaining length of the data/commands 154, the compression rate of the communication quality data may be set to the upper limit, or may be set to a value lower than the upper limit.

In this example, when the compression rate of the communication quality data exceeds the upper limit of the compression rate of the communication quality data, the compression determination unit 113 may determine the compression rate of the communication quality data so as to exceed the given length of the data/commands 154. That is, as a result of compressing the communication quality data with the upper limit of the communication quality data, when the length of the data/commands 154 exceeds the given length, the compression determination unit 113 may determine that the communication quality data is compressed with the upper limit. As a result, although the length of the packet 150 is lengthened, necessary data is transmitted.

When the length of the data/commands 154 exceeds the given length, the compression determination unit 113 may set the compression rate of the sensor measurement data whose transmission is important to a value higher than the lower limit. As a result, the length of the packet 150 is maintained to the given value to realize a communication high in reliability.

Further, when the identifier of the application represents the identifier of the above-described second application, the compression determination unit 113 selects the criterion for determining the compression rates of the sensor measurement data and the communication quality data according to the value included in the sensor measurement data.

For example, when a value indicating that abnormality is measured in any one of the sensor node 110 and the relay 120 is included in the sensor measurement data in the case where the identifier of the application represents the identifier of the above-described second application, the compression determination unit 113 first sets the compression rate of the sensor measurement data to the lower limit of the compression rate of the sensor measurement data.

Then, the compression determination unit 113 calculates the remaining length of the data/commands 154 with the lower limit of the compression rate when the sensor measurement data is compressed, and determines the compression rate of the communication quality data so that the communication quality data is stored in the calculated remaining length of the data/commands 154. In this situation, if the communication quality data is stored in the remaining length of the data/commands 154, the compression rate of the communication quality data may be set to the upper limit, or may be set to a value lower than the upper limit.

In this example, when the compression rate of the communication quality data exceeds the upper limit of the compression rate of the communication quality data, the compression determination unit 113 may determine the compression rate of the communication quality data so as to exceed the given length of the data/commands 154. That is, as a result of compressing the communication quality data with the upper limit of the communication quality data, when the length of the data/commands 154 exceeds the given length, the compression determination unit 113 may determine that the communication quality data is compressed with the upper limit. As a result, although the length of the packet 150 is lengthened, necessary data is transmitted.

When the length of the data/commands 154 exceeds the given length, the compression determination unit 113 may set the compression rate of the sensor measurement data whose transmission is important to a value higher than the lower limit. As a result, the length of the packet 150 is maintained to the given value to realize a communication high in reliability.

Also, for example, when a value indicative of abnormality is included in none of the sensor measurement data in the case where the identifier of the application represents the identifier of the above-mentioned second application, because the transmission of the communication quality data is important, the compression determination unit 113 sets the compression rate of the sensor measurement data to the lower limit of the compression rate of the communication quality data.

Then, the compression determination unit 113 calculates the remaining length of the data/commands 154 with the lower limit of the compression rate when the communication quality data is compressed, and determines the compression rate of the communication quality data so that the sensor measurement data is stored in the calculated remaining length of the data/commands 154. In this situation, if the sensor measurement data is stored in the remaining length of the data/commands 154, the compression rate of the sensor measurement data may be set to the upper limit, or may be set to a value lower than the upper limit.

In this example, when the compression rate of the sensor measurement data exceeds the upper limit of the compression rate of the sensor measurement data, the compression determination unit 113 may determine the compression rate of the communication quality data so as to exceed the given length of the data/commands 154. That is, as a result of compressing the sensor measurement data with the upper limit of the sensor measurement data, when the length of the data/commands 154 exceeds the given length, the compression determination unit 113 may determine that the sensor measurement data is compressed with the upper limit. As a result, although the length of the packet 150 is lengthened, necessary data is transmitted.

When the length of the data/commands 154 exceeds the given length, the compression determination unit 113 may set the compression rate of the sensor measurement data whose transmission is important to a value higher than the lower limit. As a result, the length of the packet 150 is maintained to the given value to realize a communication high in reliability.

In the method of determining the compression rate as described above, the compression rate of the data whose transmission is important is set to the lower limit. However, the control unit 114 according to this embodiment may increase or decrease the upper limit or the lower limit of the compression rate according to the degree of the values indicated by the sensor measurement data and the communication quality data.

For example, the control unit 114 refers to the contents of the sensor measurement data and the communication quality data. When data indicating that the communication quality is low exists in all of the communication quality data, but the degree of low communication quality is not so severe, the control unit 114 may set the lower limit of the compression rate of the communication quality data to be higher than the lower limit of the compression rate of the communication quality data in the case where the degree of low communication quality is severe, and set the upper limit of the compression rate of the sensor measurement data to be lower than the upper limit of the sensor measurement data in the case where the degree of low communication quality is severe. Then, the control unit 114 transmits the upper limit and the lower limit of the new compression rate to the compression determination unit 113.

Also, the compression rate according to this embodiment may represent a case in which all of data is transmitted without being compressed as it is, and a case in which all of data is deleted. For example, when the compression rate is indicated by values ranging from 0 to 1, and the compression rate of the sensor measurement data is set to 0, the sensor data compression unit 115 deletes all of data included in the sensor measurement data, or does not replace the data at all. Also, when the compression rate of the sensor measurement data is 1, the sensor data compression unit 115 indicates that all of the sensor measurement data is deleted.

The above processing is executed to determine the compression rates of the sensor measurement data and the communication quality data. The compression determination unit 113 transmits the determined compression rate to the control unit 114 in Step 302.

After Step 302, the control unit 114 transmits the compression rate of the sensor measurement data in the compression rates transmitted from the compression determination unit 113 to the sensor data compression unit 115, and transmits the compression rate of the communication quality data to the communication quality data compression unit 116. Then, the sensor data compression unit 115 and the communication quality data compression unit 116 acquire the sensor measurement data and the communication quality data which have been stored in the sensor data memory 117 and the communication quality data memory 118, respectively, and compress the acquired sensor measurement data and communication quality data on the basis of the transmitted compression rate (303).

In Step 302, the sensor data compression unit 115 and the communication quality data compression unit 116 use the above-described compressing method. That is, the sensor data compression unit 115 and the communication quality data compression unit 116 delete data added with the priorities low in priority from the sensor measurement data and the communication quality data, or replace the data with predicted values to compress the sensor measurement data and the communication quality data.

The sensor measurement data and the communication quality data, which have been stored in the sensor data memory 117 and the communication quality data memory 118, respectively, include the sensor measurement data and the communication quality data, which have been measured by the sensor 11B and the communication quality measurement unit 119 in the sensor node 110 or the relay 120 which executes compression, respectively. The sensor measurement data and the communication quality data also include the sensor measurement data and the communication quality data, which have been transmitted by the sensor node 110 or another relay 120, and received through the antenna 112.

After Step 303, the control unit 114 receives each compressed data from the sensor data compression unit 115 and the communication quality data compression unit 116, and stores each compressed data in the data/commands 154 of the packet 150. Then, the control unit 114 transmits the packet 150 in which each compressed data is stored to the wireless communication unit 111, and the wireless communication unit 111 wirelessly transmits the transmitted packet 150 through the antenna 112 (304).

According to the first embodiment, the optimum compression rate for transmission is determined according to the contents of the communication quality data or the sensor measurement data with the result that the shorter length of the packet 150 can be kept without unnecessarily lengthening the packet 150. As a result, a time required for transmission and reception is reduced, thereby enabling an improvement in the reliability of the wireless communication and a reduction in the power consumption to be realized.

Second Embodiment

Figure 8:
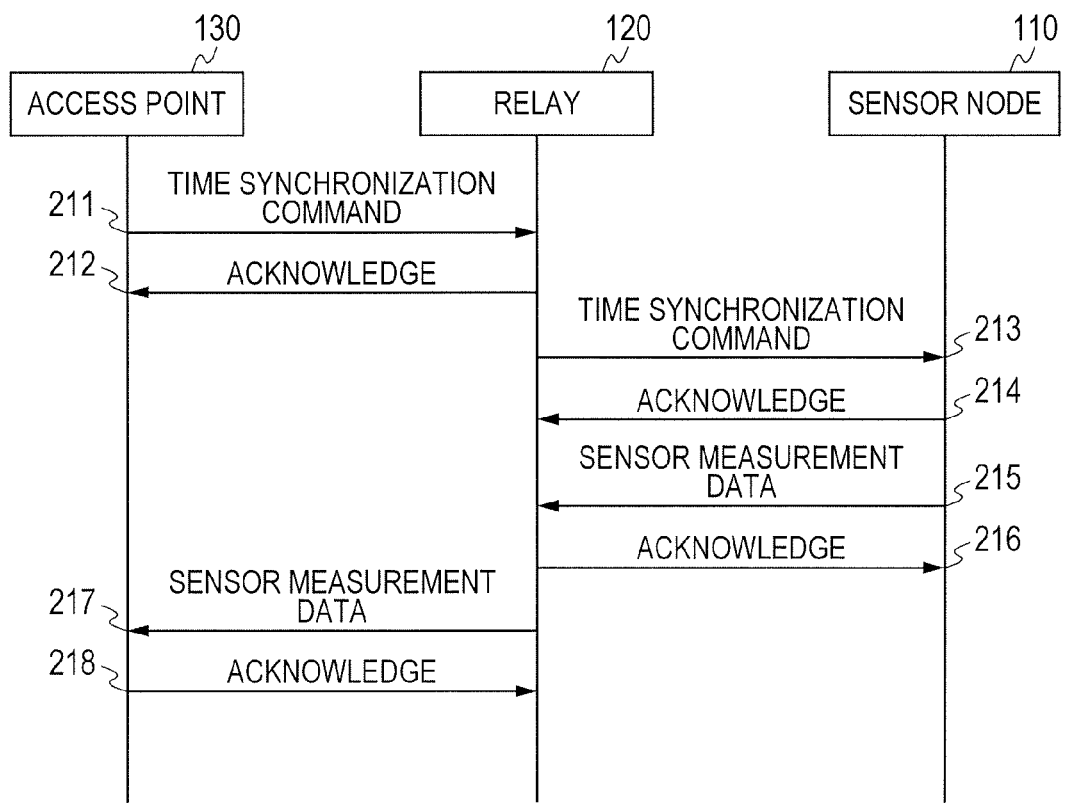
FIG. 8 is a sequence diagram illustrating a basic communication in a multihop wireless network according to a second embodiment of the present invention.

FIG. 8 is a sequence diagram illustrating a basic communication in a multihop wireless network according to a second embodiment of the present invention.

A sequence illustrated in FIG. 8 represents a wireless communication in the wireless communication network 100 in which one sensor node 110, one relay 120, and one access point 130 are provided.

The access point 130 transmits a time synchronization command to the relay 120 (211), and receives an acknowledge signal from the relay 120 (212). The relay 120 transmits the time synchronization command to the sensor node 110 (213), and receives the acknowledge signal from the sensor node 110 (214). Each wireless communication device receives the acknowledge signal to determine whether the wireless communication device to which the packet 150 is transmitted has normally received the packet 150, or not.

Subsequently, the sensor node 110 transmits the sensor measurement data to the relay 120 (215), and receives the acknowledge signal from the relay 120 (216). The relay 120 transmits the sensor measurement data to the access point 130 (217), and receives the acknowledge signal from the access point 130 (218).

Figure 9:
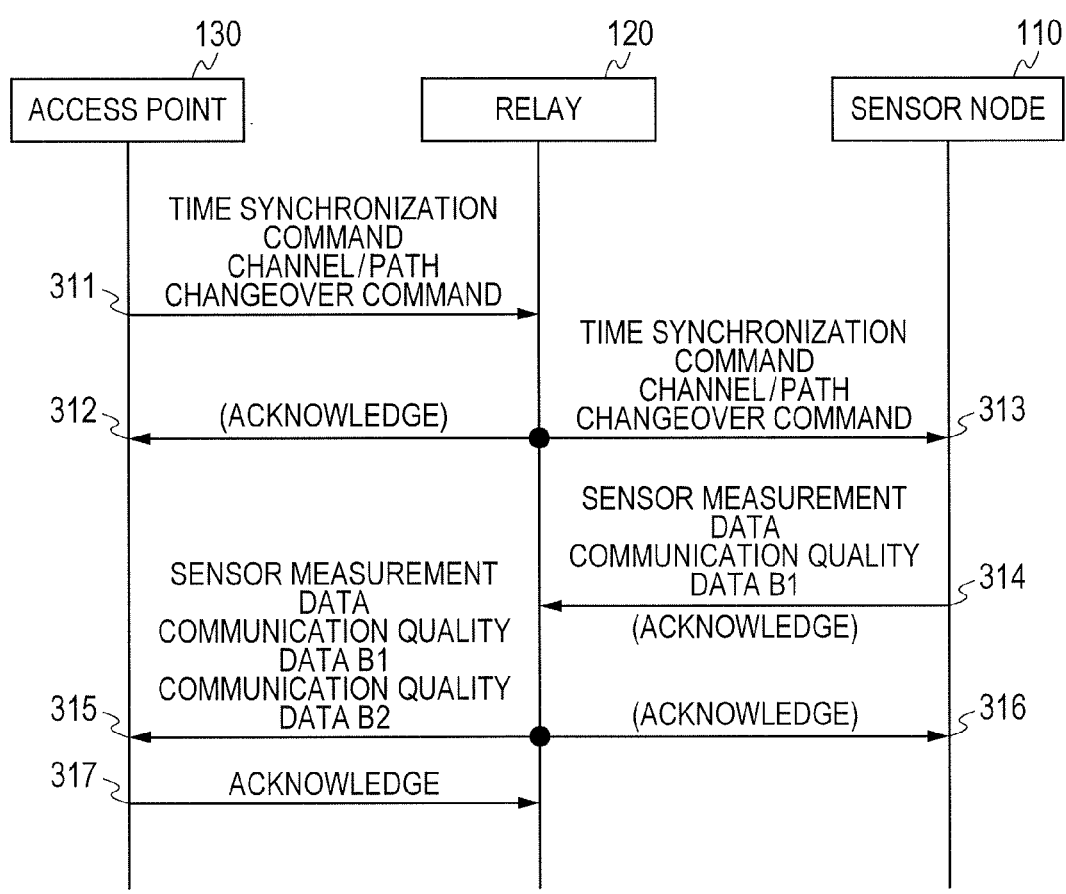
FIG. 9 is a sequence diagram illustrating a communication in the multihop wireless network using data compression according to the second embodiment of the present invention.

FIG. 9 is a sequence diagram illustrating a communication in the multihop wireless network using data compression according to the second embodiment of the present invention.

The access point 130 transmits the packet 150 including a command (time synchronization command) for synchronizing time, and a command (channel/path changeover command) for switching one channel or one path of the wireless communication to another to the relay 120 (311). The relay 120 transmits the packet 150 including the time synchronization command and the channel/path changeover command to the sensor node 110 (313). In this situation, because the packet 150 transmitted in Sequence 313 also wirelessly arrives at the access point 130, the access point 130 processes the packet 150 transmitted in Sequence 313 as an acknowledge signal (312).

Then, the sensor node 110 transmits the packet 150 including the sensor measurement data and communication quality data A to the relay 120 (314). The packet 150 transmitted in Sequence 314 is an acknowledge signal corresponding to the communication conducted in Sequence 313.

The relay 120 transmits a signal obtained by adding communication quality data B measured by the relay 120 to the sensor measurement data and the communication quality data A which have been transmitted from the sensor node 110 to the access point 130 (315). The packet 150 transmitted in Sequence 315 is an acknowledge signal to the sensor node 110 from the relay 120 corresponding to Sequence 314 (316).

Finally, the access point 130 transmits an acknowledge signal 317 to the relay 120 (317). The acknowledge signal may be replaced with a signal including a time synchronization command and a channel/path changeover command which are transmitted from the access point 130 to the relay 120 in subsequent timing.

In Sequences 311, 313, and 314, a required amount of communication quality data can be increased without unnecessarily lengthening the length of the packet 150 in the wireless communication through the above-described data compressing method. Also, because the number of wireless communications using the acknowledge signal can be decreased, a deterioration in the reliability caused by an interference between the wireless communications can be suppressed, and a reduction in power can be realized at the same time.

What is claimed is:

1. A wireless network system comprising:
   a plurality of wireless communication devices; and
   an access point connected to each of the wireless communication devices,
   wherein each of the wireless communication devices includes:
   a sensor processing unit that generates sensor data including a measurement result acquired by a sensor provided in each of the wireless communication devices;
   a communication measurement unit that generates communication quality data including a state of communication for transmitting a packet from each of the wireless communication devices;
   a compression determination unit that determines compression rates of the generated sensor data and the generated communication quality data according to the contents of the generated communication quality data;
   a compression unit that compresses the generated sensor data and the generated communication quality data according to the compression rates determined by the compression determination unit; and
   a wireless communication unit that transmits a packet including the sensor data and the communication quality data which are compressed by the compression unit to another of the wireless communication devices or the access point,
   wherein the wireless communication unit of a first wireless communication device among the wireless communication units receives a first packet transmitted from a second wireless communication device among the wireless communication devices,
   wherein the compression determination unit of the first wireless communication device determines the compression rates of a first sensor data including a sensor data included in the first packet and a sensor data generated by the sensor processing unit of the first wireless communication device, and a first communication quality data including a communication quality data included in the first packet and a communication quality data generated by the communication measurement unit of the first wireless communication device according to one of the contents of the first sensor data and the contents of the first communication quality data,
   wherein the compression unit of the first wireless communication device compresses the first sensor data and the first communication quality data at the compression rates determined by the compression determination unit of the first wireless communication device, and
   wherein the wireless communication unit of the first wireless communication device transmits a second packet including the first sensor data and the first communication quality data which are compressed by the compression unit to a third wireless communication device or the access point.

2. The wireless network system according to claim 1,
   wherein the compression determination unit records a lower limit of the compression rate of the sensor data according to one of the contents of the sensor data and the contents of the communication quality data, and a given amount of data included in the packet,
   wherein when the contents of the sensor data or the communication quality data indicate that transmission of the sensor data is important, the compression determination unit sets the compression rate of the sensor data as the recorded lower limit to increase the amount of sensor data that is compressed by the compression unit, and
   wherein the compression determination unit determines the compression rate of the communication quality data so that the amount of communication quality data is reduced to an amount obtained by subtracting the amount of sensor data that has been compressed by the compression unit from the given amount of data.

3. The wireless network system according to claim 2,
   wherein the compression determination unit records an upper limit of the compression rate of the communication quality data according to one of the contents of the sensor data and the contents of the communication quality data, and
   wherein the compression determination unit determines the compression rate of the communication quality data as the recorded upper limit of the compression rate of the communication quality data when the determined compression rate of the communication quality data exceeds the recorded upper limit of the compression rate of the communication quality data.

4. The wireless network system according to claim 2,
   wherein the sensor processing unit includes a plurality of processing functions for acquiring the measurement result through the sensor,
   wherein the compression determination unit records identifiers indicative of the respective processing functions, and criteria indicative of whether any one of the compression rate of the sensor data and the compression rate of the communication quality data is determined according to one of the contents of the sensor data and the contents of the communication quality data, and wherein when the sensor processing unit includes a first processing function, the compression determination unit determines the compression rate of the sensor data and the compression rate of the communication quality data on the basis of the identifiers of the first processing function and the recorded criteria.

5. The wireless network system according to claim 4, wherein the sensor processing units of the plurality of wireless communication devices each include the first processing function, the compression determination unit of the first wireless communication device receives the identifier of the first processing function and a first criterion which are transmitted from the access point, and records the received identifier of the first processing function and the received first criterion, wherein the wireless communication unit of the second wireless communication device transmits the first packet including the identifier of the first processing function to the first wireless communication device, and wherein the compression determination unit of the first wireless communication device selects the first criterion on the basis of the identifier of the first processing function included in the first packet, and determines the compression rates of the sensor data and the communication quality data on the basis of the selected first criteria.

6. The wireless network system according to claim 1, wherein the sensor processing unit adds a first identifier to each measurement result included in the sensor data, wherein the communication measurement unit adds a second identifier to each data included in the communication quality data, wherein the compression unit records priorities of the measurement results, a priority of the first identifier, and a priority of the second identifier, wherein the compression unit compresses the sensor data by deleting the each measurement result added with the first identifier if the each measurement result has a low priority, and wherein the compression unit compresses the communication quality data by deleting the each data added with the second identifier if the each data has a low priority.

7. A plurality of wireless communication devices connected to an access point, each of the wireless communication devices comprising:

a sensor processing unit that generates sensor data including a measurement result acquired by a sensor provided in each of the wireless communication devices;

a communication measurement unit that generates communication quality data including a state of communication for transmitting a packet from each of the wireless communication devices;

a compression determination unit that determines compression rates of the generated sensor data and the generated communication quality data according to the contents of the generated communication quality data;

a compression unit that compresses the generated sensor data and the generated communication quality data according to the compression rates determined by the compression determination unit; and a wireless communication unit that transmits a packet including the sensor data and the communication quality data which are compressed by the compression unit to another of the wireless communication devices or the access point, wherein the wireless communication unit of a first wireless communication device among the wireless communication units receives a first packet transmitted from a second wireless communication device among the wireless communication devices, wherein the compression determination unit of the first wireless communication device determines the compression rates of a first sensor data including a sensor data included in the first packet and a sensor data generated by the sensor processing unit of the first wireless communication device, and a first communication quality data including a communication quality data included in the first packet and a communication quality data generated by the communication measurement unit of the first wireless communication device according to one of the contents of the first sensor data and the contents of the first communication quality data, wherein the compression unit of the first wireless communication device compresses the first sensor data and the first communication quality data at the compression rates determined by the compression determination unit of the first wireless communication device, and wherein the wireless communication unit of the first wireless communication device transmits a second packet including the first sensor data and the first communication quality data which are compressed by the compression unit to a third wireless communication device or the access point.

8. The plurality of wireless communication devices according to claim 7, wherein the compression determination unit records a lower limit of the compression rate of the sensor data according to one of the contents of the sensor data and the contents of the communication quality data, and a given amount of data included in the packet, wherein when the contents of the communication quality data indicate that transmission of the sensor data is important, the compression determination unit sets the compression rate of the sensor data as the recorded lower limit to increase the amount of sensor data that is compressed by the compression unit, and wherein the compression determination unit determines the compression rate of the communication quality data so that the amount of communication quality data is reduced to an amount or lower obtained by subtracting the amount of sensor data that has been compressed by the compression unit from the given amount of data.

9. The plurality of wireless communication devices according to claim 8, wherein the compression determination unit records an upper limit of the compression rate of the communication quality data according to one of the contents of the sensor data and the contents of the communication quality data, and wherein the compression determination unit determines the compression rate of the communication quality data as the recorded upper limit of the compression rate of the communication quality data when the determined compression rate of the communication quality data exceeds the recorded upper limit of the compression rate of the communication quality data.

10. The plurality of wireless communication devices according to claim 8, wherein the sensor processing unit includes a plurality of processing functions for acquiring the measurement result through the sensor, wherein the compression determination unit records identifiers indicative of the respective processing functions, and criteria indicative of whether any one of the compression rate of the sensor data and the compression rate of the communication quality data is determined according to one of the contents of the sensor data and the contents of the communication quality data, and wherein when the sensor processing unit includes a first processing function, the compression determination unit determines the compression rate of the sensor data and the compression rate of the communication quality data on the basis of the identifiers of the first processing function and the recorded criteria.

11. The plurality of wireless communication devices according to claim 10, wherein the sensor processing units of the plurality of wireless communication devices each include the first processing function, the compression determination unit of the first wireless communication device receives the identifier of the first processing function and a first criterion which are transmitted from the access point, and records the received identifier of the first processing function and the received first criterion, wherein the wireless communication unit of the second wireless communication device transmits the first packet including the identifier of the first processing function to the first wireless communication device, and wherein the compression determination unit of the first wireless communication device selects the first criterion on the basis of the identifier of the first processing function included in the first packet, and determines the compression rates of the sensor data and the communication quality data on the basis of the selected first criteria.

12. The plurality of wireless communication devices according to claim 7, wherein the sensor processing unit adds a first identifier to each measurement result included in the sensor data, wherein the communication measurement unit adds a second identifier to each data included in the communication quality data, wherein the compression unit records priorities of the measurement results, a priority of the first identifier, and a priority of the second identifier, wherein the compression unit compresses the sensor data by deleting the each measurement result added with the first identifier if the each measurement result has a low priority, and wherein the compression unit compresses the communication quality data by deleting the each data added with the second identifier if the each data has a low priority.

* * * * *